(12) United States Patent
Mangold et al.

(10) Patent No.: US 9,538,320 B2
(45) Date of Patent: Jan. 3, 2017

(54) SYSTEM AND METHOD FOR MANAGING LOCATION SERVICES IN WIRELESS NETWORKS

(71) Applicant: Disney Enterprises, Inc., Burbank, CA (US)

(72) Inventors: Stefan Mangold, Berne (CH); Roberto Aiello, Bend, OR (US); Maria Gorlatova, Jersey City, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/324,723

(22) Filed: Jul. 7, 2014

(65) Prior Publication Data

US 2014/0323150 A1    Oct. 30, 2014

Related U.S. Application Data

(63) Continuation of application No. 13/097,750, filed on Apr. 29, 2011, now Pat. No. 8,774,843.

(51) Int. Cl.
*H04W 24/00* (2009.01)
*H04W 4/02* (2009.01)
*H04W 8/16* (2009.01)
*H04W 12/02* (2009.01)

(52) U.S. Cl.
CPC .............. *H04W 4/02* (2013.01); *H04W 8/16* (2013.01); *H04W 12/02* (2013.01)

(58) Field of Classification Search
CPC ......... H04W 64/00; H04W 4/02; H04W 88/08
USPC .................... 455/456.5, 456.1, 561
See application file for complete search history.

(56) References Cited

U.S. PATENT DOCUMENTS

| 6,147,642 | A | * | 11/2000 | Perry | H04B 7/18547 342/357.52 |
| 6,785,551 | B1 | * | 8/2004 | Richard | H04W 4/02 340/995.24 |
| 2006/0095540 | A1 | * | 5/2006 | Anderson | H04N 1/00281 709/217 |
| 2010/0165910 | A1 | * | 7/2010 | Mathews | H04B 7/15528 370/315 |

* cited by examiner

*Primary Examiner* — Danh Le
(74) *Attorney, Agent, or Firm* — Ference & Associates LLC (57) ABSTRACT

Described herein are methods, systems, apparatuses and products for managing location services in wireless networks. One aspect provides a method of receiving in a mobile device an identifier broadcast from a terrestrial wireless device located at a particular position; and using the identifier broadcast from the terrestrial wireless device to determine a physical location of the mobile device even in absence of a logical connection existing between the mobile device and the terrestrial wireless device. Other embodiments are disclosed.

19 Claims, 8 Drawing Sheets

SYSTEM AND METHOD FOR MANAGING LOCATION SERVICES IN WIRELESS NETWORKS

CROSS REFERENCE TO RELATED APPLICATIONS

This Application is a divisional application of co-pending U.S. patent application Ser. No. 13/097,750, filed on Apr. 29, 2011 and entitled "SYSTEM AND METHOD FOR MANAGING LOCATION SERVICES IN WIRELESS NETWORKS", which is fully incorporated by reference herein.

FIELD OF THE INVENTION

The subject matter described herein generally relates to managing location services offered within a network. Certain aspects focus on maintaining privacy.

BACKGROUND

In addition to offering technological advantages, femtocell deployments allow for precise fine-grained localization of mobile devices. With femtocell aided localization, as each femtocell base station's coverage area is small, it becomes possible to determine whether a device is inside a house, at a particular restaurant, near a specific park attraction, in a particular section of a store, or in a particular part of an office building. Femtocell-aided localization may become the preferred method of localizing devices in indoor environments given the challenge of using GPS receivers indoors. Additionally, femtocell-based localization may be preferable over localization based on IEEE 802.11 Wi-Fi hotspots since, while Wi-Fi is often turned off when not in use, cellular devices typically remain connected with the network at all times to be able to receive voice calls. Precise localization of mobile devices offers many exciting opportunities, for example in entertainment theme parks, where users will not only be able to determine their location on a map, but will also be able to interact with entertainment attractions (for example, play scavenger hunt games, unlock treasures, et cetera).

Third-party localization systems (TLSs) that map wireless station locations and use the information later to provide devices with estimates of their positions are becoming more and more common. TLSs are able to localize mobile devices due to wireless stations broadcasting their unique and persistent station identifiers.

BRIEF SUMMARY

In summary, one aspect provides a method comprising: broadcasting an identifier from a terrestrial wireless device in a determinable position; repeatedly changing the identifier broadcast from the terrestrial wireless device; and associating a current identifier broadcast from the terrestrial wireless device with a physical location.

Another aspect provides a method comprising: broadcasting a geocode as an identifier from a terrestrial wireless device, wherein the geocode comprises an indicia of geographical location of the terrestrial wireless device.

Another aspect provides a method comprising: receiving in a mobile device an identifier broadcast from a terrestrial wireless device located at a particular position; and using the identifier broadcast from the terrestrial wireless device to determine a physical location of the mobile device even in absence of a logical connection existing between the mobile device and the terrestrial wireless device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates probabilities of collision during a given time interval for different wireless technologies.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Providing localization services for mobile devices having a static identifier is a well-developed research area and thus will not be recounted extensively here. However, to provide context, many localization services (referred to herein as Third Party Localization Services, TLS(s)) operate essentially as follows. First, a device capable of localizing itself (for example, a GPS enabled device) surveys an area, recording station identifiers it overhears (referred to herein as a wireless station ID, or W-ID), and then it estimates of the stations' locations. The location information captured by the device is recorded in a centralized TLS database. Later, client devices that want to localize themselves submit the W-IDs they overhear to the database, get back location information (the location(s)) of the corresponding base stations, and localize themselves based on this data. This approach to localization works as long as unique and persistent station W-IDs are transmitted by base stations (femtocell base stations, cell towers, Wi-Fi hotspots, et cetera).

Thus, TLSs are able to localize mobile devices due to wireless stations broadcasting their unique and persistent station identifiers. However, such localization services may introduce privacy concerns. For example, severe security and privacy risks exist when unauthorized third parties are allowed to localize devices at a level of precision made possible by femtocell deployments. For example, allowing third-party systems to precisely determine where devices are in an office may lead to leakage of important business information. Moreover, wireless base stations broadcasting their unique and persistent station identifiers allows third party location services to provide location services without providing compensation.

Conventional interest in preserving location privacy focuses on location privacy of mobile devices themselves, rather than on base stations' location privacy. Additional related research includes examinations of TLS compromises and security considerations for device-to-TLS-database communications. However, these do not address preservation of a base station's location privacy.

Accordingly, an embodiment preserves location privacy of wireless base stations. An example embodiment, referred to herein as an Intelligent Station Identity Manager (ISIM) system, preserves location privacy of wireless base stations by making their identities (W-IDs) dynamic. In ISIM, globally unique station identities are not shared with mobile devices or third-party systems. Instead, the wirelessly broadcast station identities that are shared are dynamic, and are repeatedly changed, for example based on some policy, such as a policy determined by a femtocell network operator.

In conjunction with the preservation of location privacy, an embodiment provides authorized systems with location information, which may be of different resolution level. An example embodiment, which includes a module referred to herein as a Multiple Resolution Location Generator (MultResLoc) module, provides location information at a resolution that may depend on permission level(s) granted, for example by the network operator. For example, the permission level could depend on the level of service a system purchased, or the type of user/client device requesting location services, or the like. For example, different levels of localization information (different resolutions) may be provided to users with dedicated client devices and users with general-purpose smart phones or laptops, and/or different levels of localization information may be provided to users based on the application that requests the localization information, and the like.

It is contemplated that in some embodiments the W-ID may be configured to include location information such as a geocode where the location information comprises explicit (i.e., literal) or implicit (i.e., mapped or abstracted) indicia of the physical location of the transmitting base station (e.g., a latitude, longitude, and/or altitude). In embodiments where location privacy is not a concern, this feature can allow a mobile device to use the location information by simply listening to the W-ID without need to connect to the transmitting base station or access a third party localization service. In a specific example, latitude and longitude are placed literally within the thirty-two character SSID of a WiFi access point such that any passing WiFi enabled mobile device can determine the location information without connecting to the access point. In embodiments where location privacy is a concern, the location information can be encrypted with a static key or a repeatedly changing key to achieve privacy benefits similar to dynamic W-ID's described herein. In these embodiments mobile devices may be modified to include software capable of determining the location information from the W-ID and supplying that determined location information to other software processes in the mobile device that can make further use of the location information.

Furthermore, an embodiment provides a system to determine base station locations even if dynamic W-ID changing is employed by the stations. An example embodiment provides a monitoring device of know location that may be situated near a broadcasting base station such that the dynamic W-IDs may be associated with a known location, that is, the location of the monitoring device. The monitoring device may provide dynamic updates to a location database at an appropriate rate given the W-ID change rate of the base station in question.

It should be noted that example embodiments are described herein with a focus on 3GPP Long Term Evolution (LTE) and WiMAX IEEE 802.16 femtocells. However, these are merely used as representative examples to provide clear and precise description. Those having ordinary skill in the art will recognize that the developed approaches described in connection with the example embodiments may be applied to other femtocell technologies (such as, CDMA2000 or TD-SCDMA femtocells), as well as to Wi-Fi IEEE 802.11 hotspots, other base stations, and the like. For example, the stations, base stations, and/or femtocell base stations referred to herein include more generally any terrestrial wireless device having a (at least temporarily) fixed position, including but not limited to wireless base stations, wireless access points, femtocells, short-range wireless devices/BLUETOOTH devices, and the like, as compared with satellites (non-terrestrial wireless devices) used for GPS.

Similarly, the identifiers referred to herein for such terrestrial wireless devices may vary according to the particular technology, but may include for example a cell phone base station identifier; a Wi-Fi device identifier; a short range wireless technology device/BLUETOOTH device identifier; and a Worldwide Interoperability for Microwave Access (WiMAX) device identifier, and the like. Thus, depending upon the particular device(s) and technologies used, the identifier that is broadcast may include for example a service set identification (SSID), a MAC address, an IP address, and the like.

Moreover, the devices consuming the location information described throughout as user devices, client devices, and the like should be understood to generally include mobile client devices, for example smart phones, lap top computers, dedicated mobile computing devices, mobile computing devices generally, and the like; or, as further described herein, a monitoring device.

The description now turns to the figures. The illustrated example embodiments will be best understood by reference to the figures. The description is intended only by way of example and simply illustrates certain example embodiments representative of the invention, as claimed.

Intelligent Station Identity Management

Figure 1:
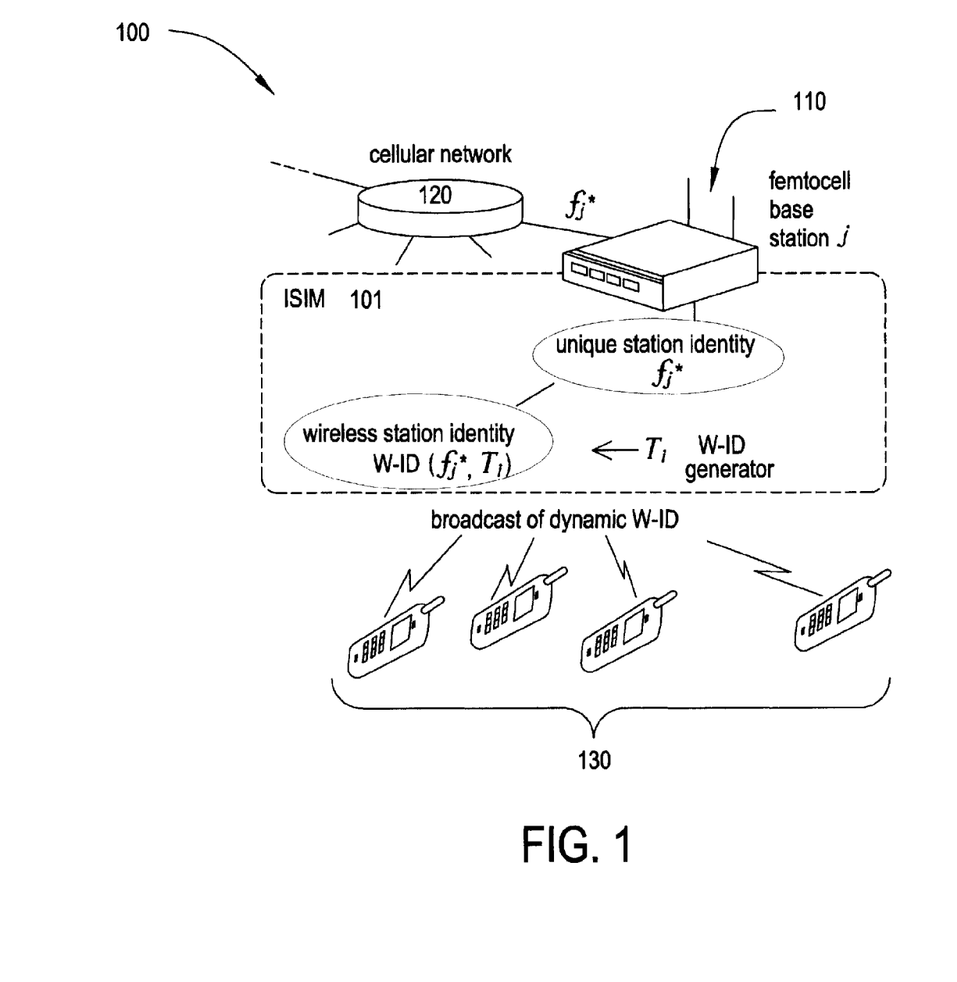
FIG. 1 illustrates an example station identity management system.

According to an embodiment, an Intelligent Station Identity Manager (ISIM) module 101 preserves base stations' location privacy by making wirelessly transmitted station identities (W-IDs) dynamic. Some nomenclature used throughout is summarized in Table I as a quick reference.

TABLE 1

Nomenclature

| | |
|---|---|
| $f_j^*$ | Permanent station ID of femtocell base station j |
| WID($f_j^*$, $T_i$) | Dynamic station ID of base station j at time $T_i$ |
| k | Number of bits in the W-ID that are modified |
| x | Size of the W-ID space |
| $\lambda_{ch}$ | Rate of W-ID changes [1/h] |
| $t_{ch}$ | Time a W-ID change takes [s] |
| $N_{nbr}$ | Number of stations in a neighborhood |
| L | Number of stations synchronously changing W-IDs |
| K | Number of calls a station can simultaneously maintain |
| $\lambda_{call}$ | Femtocell base station call arrival rate [1/h] |
| $h_{call}$ | Average call duration [h] |
| a | Femtocell coverage area [m$^2$] |
| d | Distance a mobile device travels inside a femtocell [m] |
| v | Average mobile device speed [m/s] |
| $c_{dev}$ | Concentration of mobile devices [1/m$^2$] |
| $f_{loc}$ | Fraction of devices reporting locations to a TLS |
| F | Total number of base stations running ISIM |

An example system structure is shown schematically in FIG. 1. Each femtocell/base station 110, j, (only one is illustrated for simplicity) has a unique ID, $f_j^*$. The $f_j^*$ is used in the femtocell's (j) 110 communication with the rest of the cellular network 120 (macrocell, gateways, et cetera). However, $f_j^*$ is not revealed (broadcast) to the mobile devices 130 accessing the femtocell base station 110. For each j 110, the wirelessly broadcast identity (femtocell W-ID) is a dynamic, time-dependent entity that is repeatedly changed, termed herein as: W-ID ($f_j^*$, $T_i$), where $T_i$ denotes the time instance. Note that an embodiment provides that the station ID visible to the rest of the network 120, $f_j^*$, does not change with time. Thus, an embodiment does not require modifications to the overall network architecture. For example, cellular operator-side services, such as E911 and E112 services, are not affected.

The dynamically generated W-IDs may follow the femtocell technology (LTE, WiMAX, et cetera) specifications. In the representative example technologies described in detail herein, the wirelessly broadcast information that identifies a station 110 is as follows:

W-CDMA/LTE: each base station 110 has a globally unique Cell Global Identity (CGI). A CGI consists of a set of codes identifying the network area, and also includes a 16 bit long Cell Identity code that can be modified. The standards also define an optional femtocell HNB Name, which is a maximum of 48 characters long. In addition, in LTE, the cell can be identified by a locally unique Physical Cell Identity (PCI). LTE allows for only 504 PCIs.

IEEE 802.16 (WiMAX): each base station 110 has a 48 bit long base station ID (BSID), where 24 bits indicate the station operator and the remaining 24 bits can be modified.

Accordingly, if the number of W-ID bits that may be altered is denoted by k, and the size of the W-ID selection space is denoted by x, where $x=2^k$, in cellular systems x is upper-bounded by $2^{16}$, and in WiMAX the maximal x is $2^{24}$. Again, these are merely used as representative examples.

W-ID changes may be performed by ISIM module 101 with a target nominal changeover rate, termed herein as $\lambda_{ch}$. When a femtocell base station 110 changes its W-ID, it disconnects its mobile clients 130 and becomes temporarily unavailable. This may impact the performance of the femtocell base station 110, as described further herein.

To facilitate description of potential impact on femtocell base station performance, some nomenclature used throughout is first set forth. The time it takes a femtocell station 110 to complete a W-ID change is denoted by $t_{ch}$. The number of stations in a neighborhood (again, only one station is shown in FIG. 1 for simplicity) is denoted by $N_{nbr}$, and L is used to denote the number of stations simultaneously changing their W-IDs. A W-ID change can be initiated by a station 110 itself, or by a controller with a more global knowledge. The number of calls a station 110 can simultaneously maintain is denoted by K, the average call duration is denoted by $h_{call}$, and the call arrival rate is denoted by $\lambda_{call}$. The area covered by a femtocell 110 is denoted by a, and the average distance a device (for example, one of devices 130) moves inside a femtocell coverage area is denoted by d. Additionally, v and $c_{dev}$ denote, respectively, the speed and the concentration of mobile devices 130. For example, in numerical results, d=10 m (for an example small femtocell), a=d·d=100 m$^2$, and v=1.5 km/h (which represents very slow walking).

It is expected that femtocell stations (for example 110) may be associated with many devices 130, but also be relatively lightly loaded with traffic. This is a reasonable assumption for many public environments, such as stadiums or entertainment parks.

Effect on Femtocell System Performance

In general, femtocell base stations (for example 110) performing W-ID changes may affect system performance. It should be noted, however, that W-ID changes only affect the femtocell stations' wireless interface. During W-ID changes, mobile clients 130 can connect to a macrocell whose functionality is not affected. The femtocell base station 110 connection with the rest of the cellular operator network 120 is also not affected.

The number of calls not serviced due to a base station 110 changing its W-ID is simply $\lambda_{call}=t_{ch}\cdot\lambda_{ch}$. This indicates that $t_{ch}$ should be kept short if relatively frequent W-ID changes are desired. For a lightly loaded system (small $\lambda_{call}$), the femtocell base station's 110 inaccessibility associated with W-ID changeovers should not be significant, particularly since the devices 130 are serviced by a macrocell while the femtocell 110 is temporarily inaccessible.

Figure 2A:
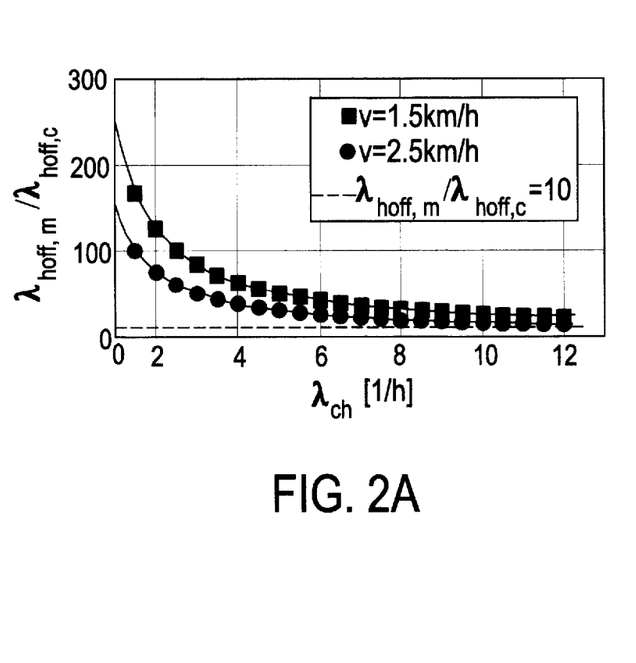
FIG. 2A illustrates handoffs due to W-ID change rate and device mobility for two representative values of device mobility.

When a femtocell base station 110 performs a W-ID change, the devices 130 within its coverage area that have calls in progress have to handoff. In many practical environments, however, the number of handoffs due to mobility is substantially higher than the number of handoffs introduced by W-ID changes. It can be demonstrated that $\lambda_{hoff,m}/\lambda_{hoff,c}=(v/d)/\lambda_{ch}$, where $\lambda_{hoff,c}$ and $\lambda_{hoff,m}$ are the handoff rates due to W-ID changes and due to mobility, respectively. FIG. 2A shows the $\lambda_{hoff,m}/\lambda_{hoff,c}$ ratio as a function of $\lambda_{ch}$ for two different values of average mobile device speed v. It can be observed from FIG. 2A that handoffs due to mobility greatly exceed handoffs due to W-ID changes. Even for relatively frequent W-ID changes (10-12 times per hour), $\lambda_{hoff,m}$ is over 10 times greater than $\lambda_{hoff,c}$.

Figure 2B:
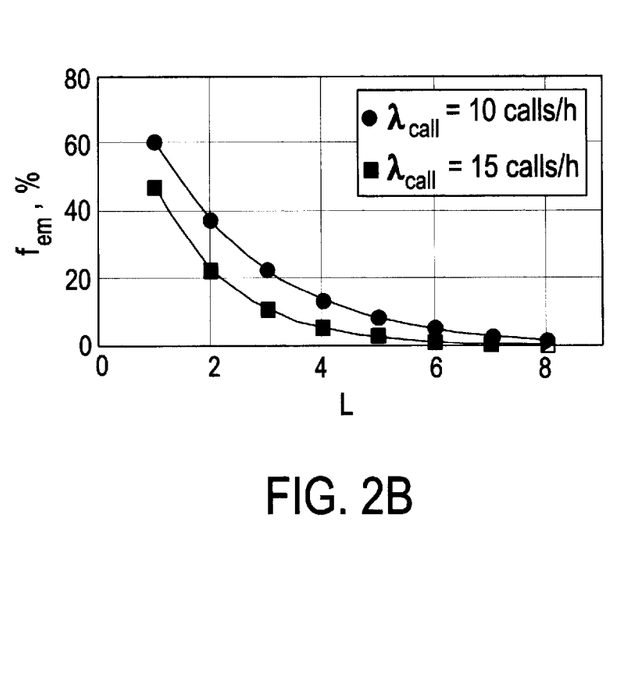
FIG. 2B illustrates representative expected fractions of time that stations will not have calls in progress for two representative call rates.

W-ID changes should be conducted without disrupting calls in progress, if possible. $\lambda_{ch}$ is the target W-ID change rate since the W-ID change is not necessarily performed at the exact $1/\lambda_{ch}$ intervals; rather, the stations (for example, 110) may wait until they have no calls in progress to change their W-IDs. The expected fraction of time that L stations do not have calls in progress, $f_{em}{}^L$, can be approximated, using M/M/K queue formulations, as $$f_{em}^L = P_0^{tot} = P_0(1) \cdot \ldots \cdot P_0(L) = \left(\sum_{n=0}^{K} \frac{1}{n!}\left(\frac{\lambda_{call}}{1/h_{call}}\right)\right)^{-L}$$

and is demonstrated in FIG. 2B as a function of the number of stations L for two different values of $\lambda_{call}$. It can be observed from FIG. 2B that when L is relatively small, the expected fraction of time the stations (for example, 110 of FIG. 1) do not have calls in progress is relatively high, and thus it should be generally possible to not disrupt the calls in progress to change the W-IDs.

W-ID Selection Schemes: Centralized and Distributed

For each time interval $T_i$, W-ID ($f^*_j$, $T_i$) can be set by the station j 110 itself, or by a control station (distributed or centralized W-ID selection). A W-ID collision happens when more than one station j 110 in a neighborhood uses the same WID ($f^*_j$, $T_i$) for the same $T_i$. Some of the station identities that may be modified according to an embodiment, such as GCIs and MAC addresses, are considered by the protocols to be fixed and unique, and collisions between them are highly undesirable. For others, such as LTE PCIs, collision alleviation mechanisms exist, but nonetheless it may be preferable to avoid collisions. Collisions are easily avoided with a centralized mechanism, but are possible with distributed assignments.

W-ID collision probability can be upper-bounded as follows. Suppose each station 110 sets its W-ID randomly. The probability of a W-ID collision during time interval T is denoted by $P_T$:

$$P_T = 1 - (1 - p_c)^{T \cdot \lambda_{ch}},$$

where $$p_c = 1 - \left(\frac{x-1}{x}\right)^{\frac{N_{nbr}(N_{nbr}-1)}{2}}$$

Figure 3A:
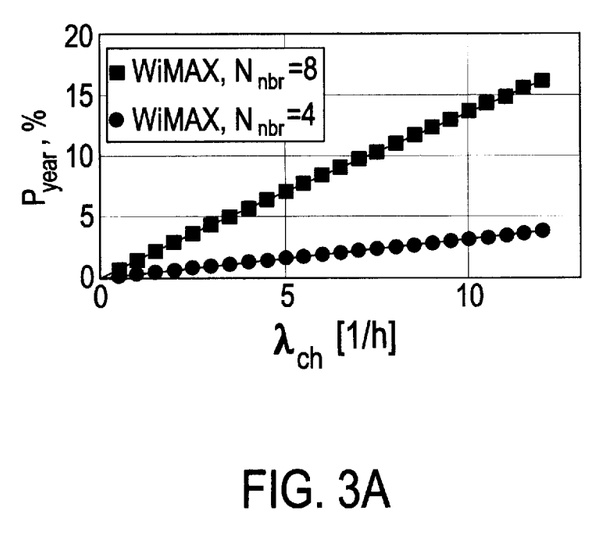
Figure 3B:
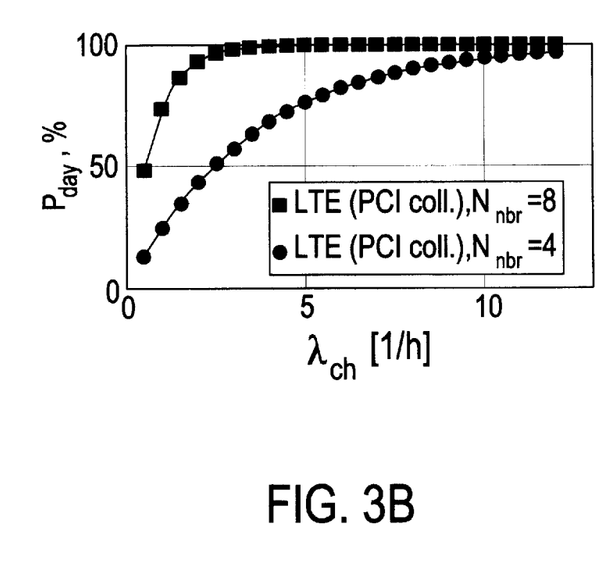

As previously noted, the W-ID selection space x used in these calculations depends on the femtocell technology, and thus for different technologies $P_T$ differs drastically. For example, FIG. 3(A-B) demonstrates $P_T$ as a function of $\lambda_{ch}$ for two different values of $N_{nbr}$ for two different technologies. FIG. 3A demonstrates $P_T$ values for IEEE 802.16 BSIDs ($x=2^{24}$) for T=year, while FIG. 3B demonstrates $P_T$ for LTE PCI (x=504) for T=day. It can be observed from FIG. 3(A-B) that probabilities of W-ID collisions are high for LTE PCIs and low for IEEE 802.16 BSIDs. Thus, for IEEE 802.16, simple decentralized BSID assignment schemes may be used, while for LTE, coordinated PCI assignments may be preferable.

Where decentralized assignments are suitable, stations (for example, 110 of FIG. 1) may, for example, use cryptographic hash functions to independently generate their W-IDs. Simple algorithmic improvements (that is, considering W-IDs of neighboring stations) may reduce the number of W-ID collisions relative to the above-stated upper bounds. More involved distributed assignment algorithms, such as those based on graph coloring, could also be considered.

Effects on the Performance of Third-Party Localization Services (TLSs)

As described herein, it is common for TLSs to prepare a centralized database having W-ID-to-locations mappings, and look up the mappings when localizing a device (for example, one of client devices 130 in FIG. 1) based on the W-IDs it is overhearing. When dynamic W-IDs are reported to a TLS's centralized database, database integrity will become difficult to preserve. In-database W-ID collisions would be a major issue for a centralized TLS database, such as when dynamic W-ID changing is employed. For the femtocell system, W-ID collisions are "local", and their probabilities are relatively small due to a relatively small number of neighboring stations $N_{nbr}$. Using $f_{loc}$ to denote the fraction of devices that update a TLS database with W-ID-to-location mappings and F to denote the overall number of femtocell base stations stored in a TLS database, these difficulties may be formulated as follows.

When locations and W-IDs of F different femtocell stations (where $F \gg N_{nbr}$) are aggregated, the probability of a W-ID collision in an interval T is $$P_T = 1 - \left(\frac{x-1}{x}\right)^{\frac{T \cdot \lambda_{ch} \cdot F(T \cdot \lambda_{ch} \cdot F - 1)}{2}}$$

which is generally high since the number of possibly colliding entries, $T \cdot \lambda_{ch} \cdot F$, is large. For example, for F=100 and $\lambda_{ch}=4$, $P_T > 99\%$ when T is just an hour.

Figure 4A:
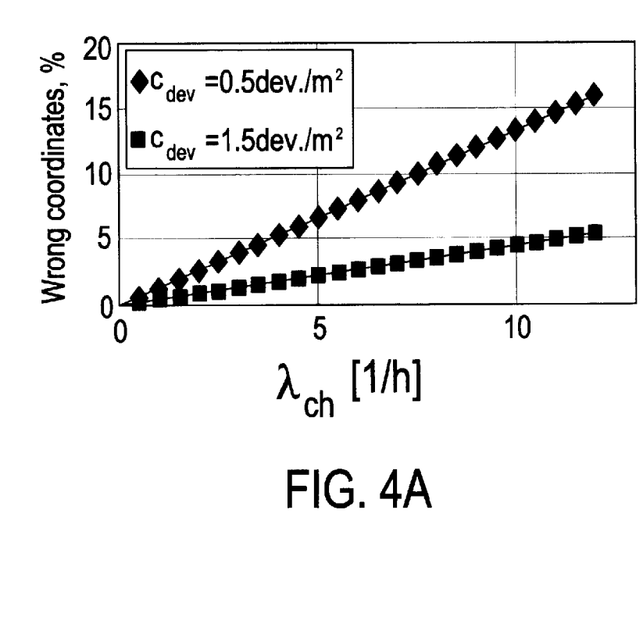
FIG. 4A illustrates a percentage of devices obtaining wrong coordinates from a TLS database as a function of change rate.
Figure 4B:
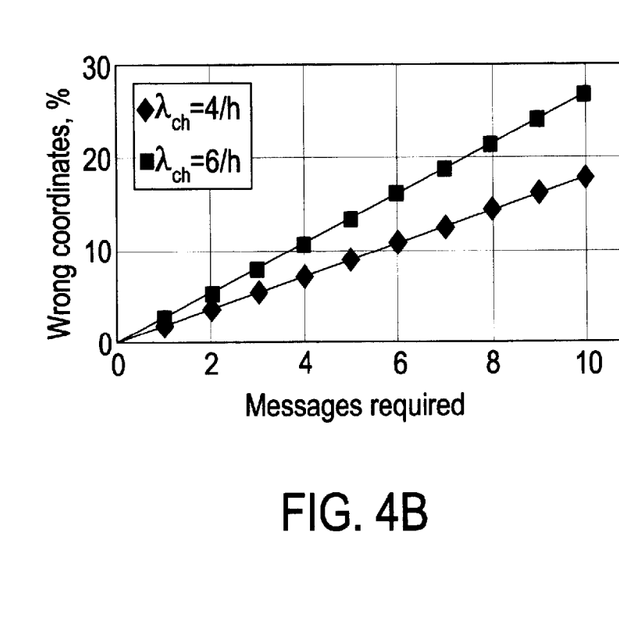
FIG. 4B illustrates a percentage of devices obtaining wrong coordinates from a TLS database for different change rates for given measurements required to update the TLS database.

Typically, a TLS needs to obtain a number of W-ID-to-location reports (messages, measurements) from wireless devices before it updates its database with a W-ID-to-location mapping. For example, assume that a TLS updates its database after a single device reports an updated WID-to-location mapping. The time until the first such device arrives to a femtocell is denoted by $T_{loc}$. It can be demonstrated that $\mathbb{E}(T_{loc})=[d/v]/[f_{loc} \cdot c_{dev} \cdot a]$. Prior to $T_{loc}$, all mobile devices (such as one of client devices 130 in FIG. 1) that request location information from a TLS receive grossly incorrect information (or no information at all). The number of these client devices (for example, client devices 130) is $1/f_{loc}$, and their percentage (wrong coordinates) is demonstrated in FIG. 4A for $f_{loc}=1\%$ for two different values of client device (for example, client devices 130) concentration $C_{dev}$. It can be observed from FIG. 4A that a substantial percentage of client devices (for example, client devices 130) relying on a TLS obtain wrong location information (which is desired according to an embodiment) when the W-ID change is performed as infrequently as four to six times per hour. The percentage of client devices (for example, client devices 130) receiving incorrect information, for a more practical case of a TLS requiring more than one report (message, measurement) prior to updating its database, is demonstrated in FIG. 4B. It can be observed from FIG. 4B that the percentage of client devices receiving wrong information (coordinates) grows with the number of measurements (messages) required by a TLS.

Multi-Resolution Location

As described herein, an embodiment prevents unauthorized parties from obtaining base station location information via use of dynamic W-IDs. An embodiment may also provide the location information selectively, for example to authorized client devices, users, applications, and the like, via protecting the location information broadcast and/or protecting access to stored location information such that only authorized devices/applications/parties may obtain the location information. The location information may be protected in a variety of ways, such as through various encryption schemes, requirements for credentials, and the like.

Figure 5:
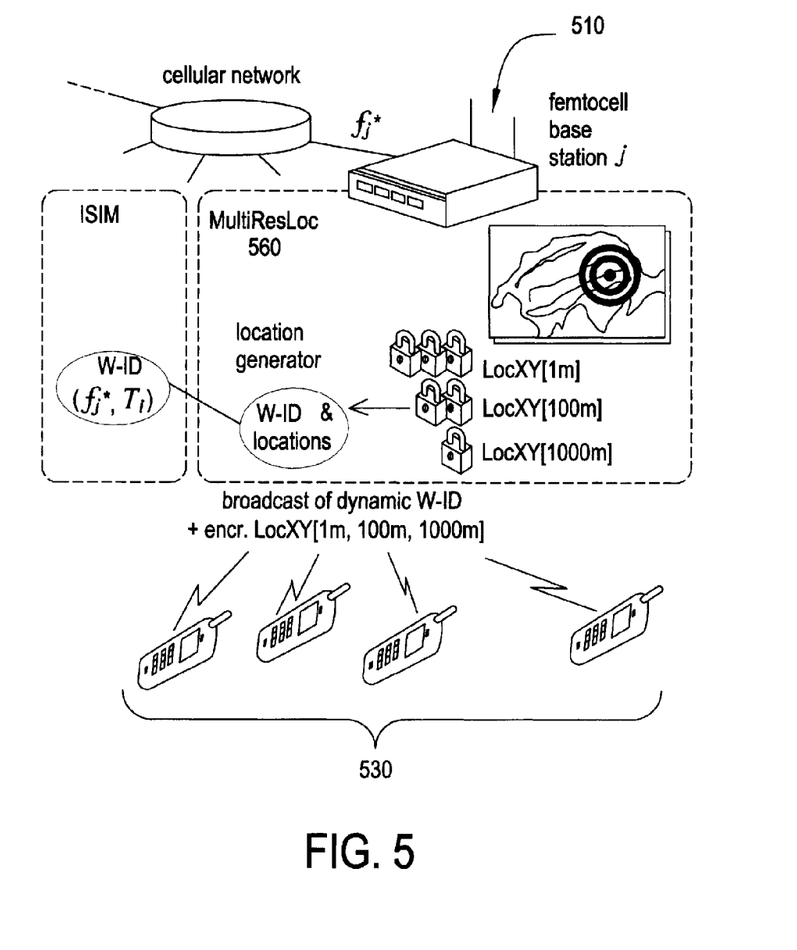
FIG. 5 illustrates an example multiple resolution location generation.

An example embodiment provides selective location information via a Multi-Resolution Location Generator (MultResLoc) module 560, as illustrated in FIG. 5. Femtocell base station locations, such as that of base station 510, may broadcast wirelessly throughout the femtocell at multiple resolution levels (for example, accurate to within 1 m, accurate to within 100 m, accurate to within 1000 m and the like), all at the same time, as shown schematically in FIG. 5. Each femtocell base station 510 may specify its location with several levels of precision, and separately protect, for example via encryption, each of the specified resolution levels. Conversely, instead of broadcasting the location information, access to stored location information may be provided selectively using a protection scheme, such as encryption, requirement for credentials/authentication, and the like.

Figure 6:
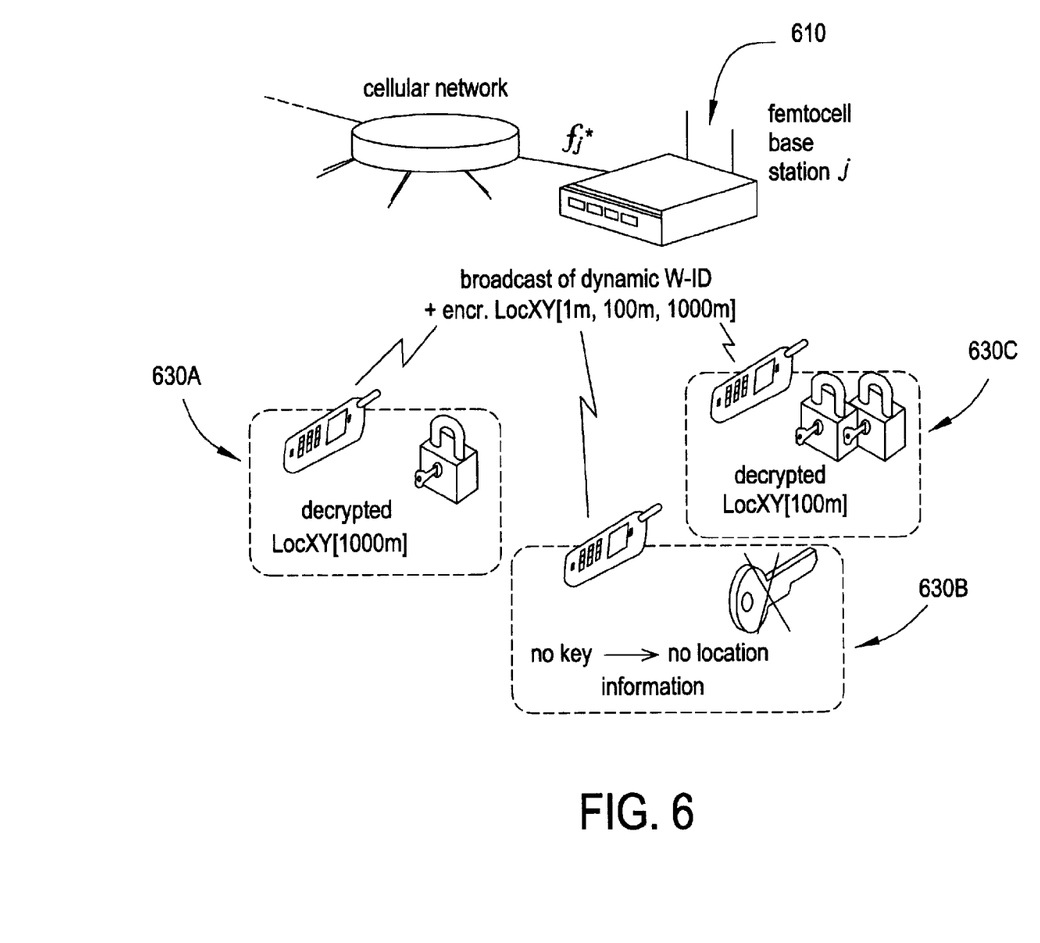
FIG. 6 illustrates an example of mobile devices using broadcast information to localize themselves at different resolutions.

FIG. 6 demonstrates an example of how mobile client devices 630A, 630B, 630C may use broadcast information to localize themselves. In the example illustrated, each client device 630A, 630B, 630C decrypts the location information corresponding to its permission level. Thus, client devices 630A and 630C may be given a key that enables them to decrypt encrypted location coordinates of 1000 m and 100 m resolutions, respectively. In contrast, client device 630B does not have (or have access to) a key for any of the broadcast information, and thus cannot make use of the broadcast location information. Similarly, retrieval of location information by client devices may be restricted, at different resolution levels, based on another protection scheme, such as by requiring a client device to authenticate itself using credentials prior to releasing location information, where the level of accuracy of the location information accessible by the client is dependent upon the credentials supplied, et cetera. In one example, the location information may be intentionally erroneous and/or random, such as responsive to determining the credentials are received from a TLS device. This may be used to prohibit TLS devices from making use of one or more base stations' location information. Such an approach may include using planned error introduced into a neighborhood of base stations such that a TLS device may not determine the true locations from listening to more than one base station.

The design parameters in MultResLoc 560 may include for example the number of supported resolutions and area specifications, which depend on technical parameters (for example, system complexity and base station locations), as well as business needs. Using MultResLoc 560 to provide location information may be desirable when the previously described ISIM module 101 is used to preserve the location privacy of the femtocell base stations 110. The combination of MultResLoc 560 and ISIM 110 gives operators the full control to manage location privacy in cellular networks, such as networks with femtocell deployments.

Figure 7:
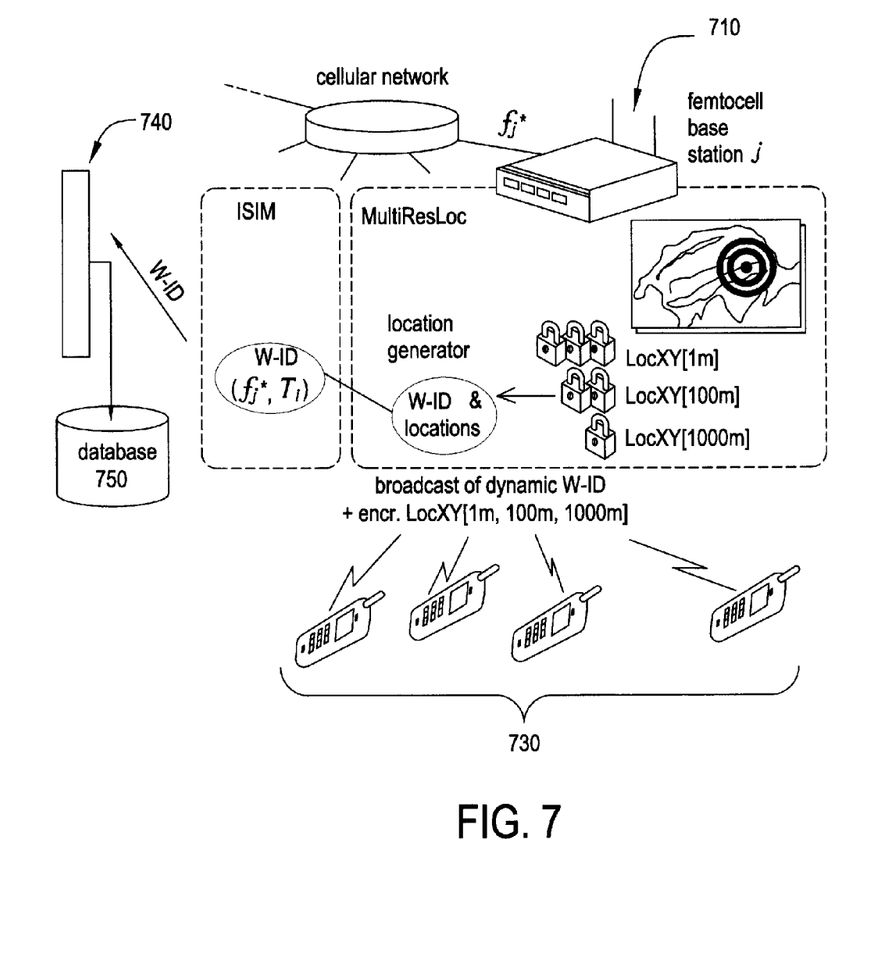
FIG. 7 illustrates an example of determining location of a station that is repeatedly changing identifiers.

Referring to FIG. 7, an embodiment provides a system to determine base station locations even if dynamic W-ID changing is employed. For example, a monitoring device 740 (of know location) may be positioned near a femtocell base station 710. This monitoring device 740, which may be stationary, is able to observe at all times the W-IDs the station 710 uses. This information may be reported by the monitoring device 740 to a database 750. Given the current W-ID of the base station 710, and the known location of the monitoring device 740 relative to the base station 710, accurate positioning information may be delivered to mobile client devices 730, even if a base station 710 is dynamically changing W-IDs. This is in contrast to existing TLSs, in which the monitoring devices are only suitable for collecting static W-IDs, as described herein. Thus, a site owner, for example in a stadium or a theme park, may benefit from monitoring the changing station W-IDs implemented by a carrier by positioning monitoring nodes, such as monitoring device 740, next to the femtocell base stations, such as base station 710, located on the site.

Figure 8:
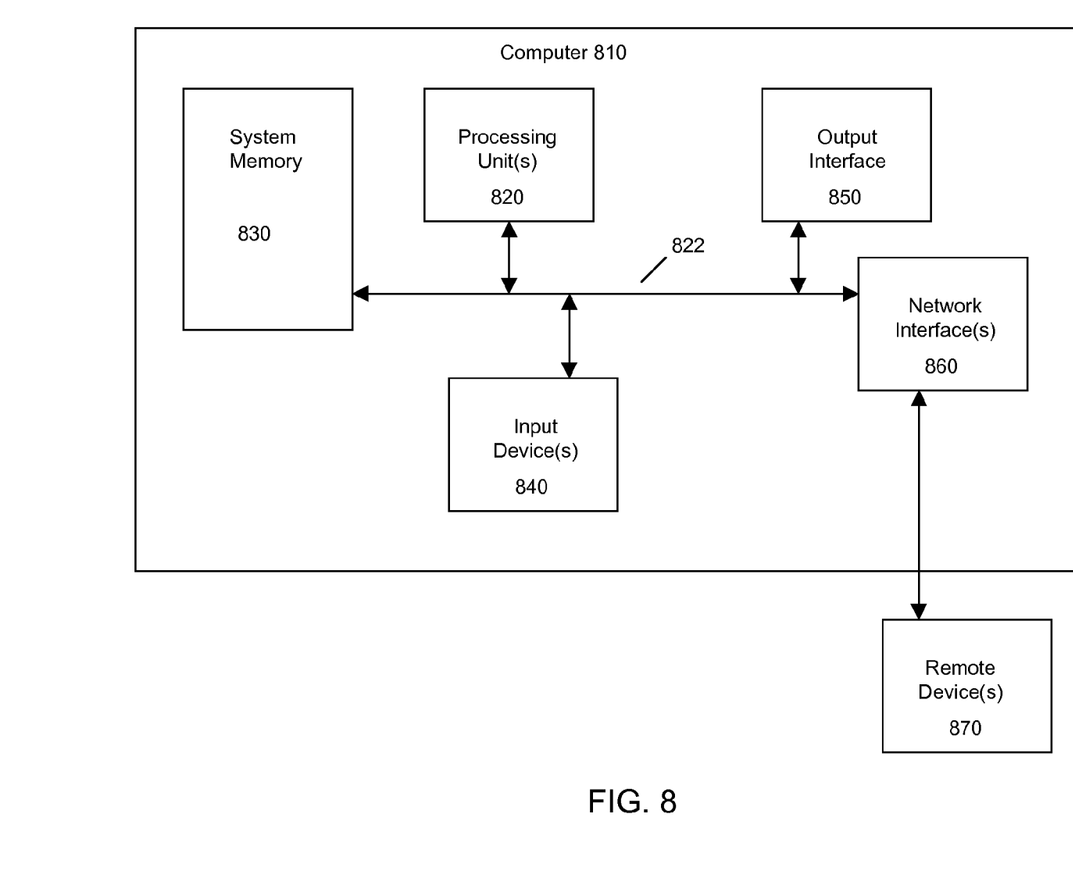
FIG. 8 illustrates an example computer system.

Referring to FIG. 8, it will be readily understood that certain embodiments can be implemented using any of a wide variety of devices or combinations of devices. An example device that may be used in implementing embodiments includes a computing device in the form of a computer 810. In this regard, the computer 810 may execute program instructions configured to dynamically change W-IDs, and perform other functionality of the embodiments, as described herein.

Components of computer 810 may include, but are not limited to, at least one processing unit 820, a system memory 830, and a system bus 822 that couples various system components including the system memory 830 to the processing unit(s) 820. The computer 810 may include or have access to a variety of computer readable media. The system memory 830 may include computer readable storage media in the form of volatile and/or nonvolatile memory such as read only memory (ROM) and/or random access memory (RAM). By way of example, and not limitation, system memory 830 may also include an operating system, application programs, other program modules, and program data.

A user can interface with (for example, enter commands and information) the computer 810 through input devices 840. A monitor or other type of device can also be connected to the system bus 822 via an interface, such as an output interface 850. In addition to a monitor, computers may also include other peripheral output devices. The computer 810 may operate in a networked or distributed environment using logical connections (network interface 860) to other remote computers or databases (remote device(s) 870). The logical connections may include a network, such local area network (LAN) or a wide area network (WAN), a cellular network, but may also include other networks.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects have been described herein with reference to illustrations of methods, apparatuses, systems and computer program products according to example embodiments. It will be understood that some or all of the functionality in the illustrations may be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the illustrations.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the illustrations.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the illustrations.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising:
broadcasting an identifier from a terrestrial wireless device, wherein the identifier comprises a geocode having an indicia of geographical location of the terrestrial wireless device; and
repeatedly changing, based on a timing policy, the identifier of the terrestrial wireless device without changing the geographic location of the terrestrial wireless device.

2. The method of claim 1, wherein the geocode comprises explicit location information.

3. The method of claim 2, wherein the explicit location information includes one or more of latitude, longitude and altitude.

4. The method of claim 2, wherein the explicit location information is inserted into a broadcast identifier of the terrestrial wireless device.

5. The method of claim 1, wherein the geocode comprises implicit location information.

6. The method of claim 5, wherein the implicit location permits derivation of one or more of latitude, longitude and altitude.

7. The method of claim 1, further comprising:
establishing a connection between the terrestrial wireless device and a client device.

8. The method of claim 1, further comprising encrypting the geocode.

9. A terrestrial wireless device, comprising:
a processor that broadcasts an identifier from the terrestrial wireless device, wherein the identifier comprises a geocode having an indicia of geographical location of the terrestrial wireless device;
wherein the processor repeatedly changes, based on a timing policy, the identifier of the terrestrial wireless device without a change to the geographic location of the terrestrial wireless device.

10. The terrestrial wireless device of claim 9, wherein the geocode comprises explicit location information.

11. The terrestrial wireless device of claim 10, wherein the explicit location information includes one or more of latitude, longitude and altitude.

12. The terrestrial wireless device of claim 11, wherein the explicit location information is inserted into a broadcast identifier of the terrestrial wireless device.

13. The terrestrial wireless device of claim 9, wherein the geocode comprises implicit location information.

14. The terrestrial wireless device of claim 13, wherein the implicit location permits derivation of one or more of latitude, longitude and altitude.

15. The terrestrial wireless device of claim 9, wherein:
the processor establishes a connection between the terrestrial wireless device and a client device.

16. The terrestrial wireless device of claim 9, wherein the processor encrypts the geocode.

17. A non-transitory program product, comprising:
a storage device that stores code executable by a processor, the code comprising:

code that broadcasts an identifier from a terrestrial wireless device, wherein the identifier comprises a geocode having an indicia of geographical location of the terrestrial wireless device;

wherein the identifier of the terrestrial wireless device is repeatedly changed, based on a timing policy, without changing the geographic location of the terrestrial wireless device.

18. The program product of claim 17, wherein the geocode comprises explicit location information.

19. The program product of claim 18, wherein the explicit location information includes one or more of latitude, longitude and altitude.

* * * * *